United States Patent
Li et al.

(10) Patent No.: US 10,963,149 B2
(45) Date of Patent: Mar. 30, 2021

(54) PARAMETER ADJUSTMENT METHOD, APPARATUS AND STORAGE MEDIUM

(71) Applicant: BEIJING XIAOMI MOBILE SOFTWARE CO., LTD., Beijing (CN)

(72) Inventors: Jiayan Li, Beijing (CN); Zhenzhou Lu, Beijing (CN); Yin Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/587,024

(22) Filed: Sep. 29, 2019

(65) Prior Publication Data
US 2020/0210055 A1    Jul. 2, 2020

(30) Foreign Application Priority Data

Dec. 27, 2018 (CN) .......................... 201811609659.1

(51) Int. Cl.
*G06F 3/0484* (2013.01)
*G06F 3/0481* (2013.01)
*G06F 3/0488* (2013.01)

(52) U.S. Cl.
CPC ........ *G06F 3/04847* (2013.01); *G06F 3/0488* (2013.01); *G06F 3/04817* (2013.01)

(58) Field of Classification Search
CPC ............. G06F 3/04847; G06F 3/04817; G06F 3/0488; G06F 3/0484; G06F 3/0487; G06F 3/04886; G06F 1/1692; G06F 1/1626
See application file for complete search history.

(56) References Cited

U.S. PATENT DOCUMENTS

| | | | |
|---|---|---|---|
| 2002/0008691 A1* | 1/2002 | Hanajima | G06F 3/0488 345/173 |
| 2012/0280922 A1* | 11/2012 | Lee | G06F 3/485 345/173 |
| 2013/0076649 A1* | 3/2013 | Myers | G06F 3/0485 345/173 |
| 2017/0171592 A1* | 6/2017 | Cui | G06F 3/04845 |

FOREIGN PATENT DOCUMENTS

| | | |
|---|---|---|
| EP | 3091426 A1 | 11/2016 |
| EP | 3333688 A1 | 6/2018 |
| WO | 3333688 A1 | 7/2017 |

OTHER PUBLICATIONS

Extended European search report of counterpart EP application No. 19199934.1 dated Mar. 16, 2020.

* cited by examiner

*Primary Examiner* — Matthew Ell
(74) *Attorney, Agent, or Firm* — Syncoda LLC; Feng Ma (57) ABSTRACT

A parameter adjustment method is applied to a terminal including a first screen at a side surface of the terminal, and a second screen displayed at one of a front surface or a back surface, or both the front surface and the back surface, of the terminal. The method includes: receiving a first touch operation at a predetermined region of the first screen; displaying an adjustment bar of a target parameter at the first screen according to the first touch operation, wherein the target parameter is associated with an application displayed at the second screen; receiving a second touch operation acting on the adjustment bar; and adjusting a parameter value of the target parameter according to the second touch operation.

14 Claims, 8 Drawing Sheets

PARAMETER ADJUSTMENT METHOD, APPARATUS AND STORAGE MEDIUM

CROSS-REFERENCE TO RELATED APPLICATION

This application claims priority to Chinese Patent Application No. 201811609659.1, filed on Dec. 27, 2018, the disclosure of which is hereby incorporated by reference in its entirety.

BACKGROUND

During a process of a user's use of an application in a terminal, some parameters of the application may be needed to be adjusted. For example, the application may be a call application. If there is a lot of ambient noises during the call, the user cannot hear contents of the call played by the call application, and the user may need to increase volume of the call application.

In an example, the user can adjust the volume by pressing a volume up key or a volume down key. The volume up key is pressed to increase the volume, and the volume down key is pressed to decrease the volume.

SUMMARY

The present disclosure relates to the field of computer technologies, and more specifically to a parameter adjustment method, a parameter adjustment apparatus, and a storage medium.

According to a first aspect of embodiments of the present disclosure, a parameter adjustment method is provided applied to a terminal which includes a first screen displayed on a side surface of the terminal and a second screen displayed on a front surface and/or a back surface of the terminal, including:

receiving a first touch operation acting in a predetermined region of the first screen;

displaying an adjustment bar of a target parameter in the first screen according to the first touch operation, wherein the target parameter is related to an application displayed in the second screen;

receiving a second touch operation acting on the adjustment bar;

adjusting a parameter value of the target parameter according to the second touch operation.

According to a second aspect of the embodiments of the present disclosure, a parameter adjustment apparatus is provided applied to a terminal which includes a first screen displayed on the side surface of the terminal and a second screen displayed on the front surface and/or the back surface of the terminal, including:

a first receiving module, configured to receive a first touch operation acting in a predetermined region of the first screen;

a display module, configured to display an adjustment bar of a target parameter in the first screen according to the first touch operation, wherein the target parameter is related to an application displayed in the second screen;

a second receiving module, configured to receive a second touch operation acting on the adjustment bar;

an adjustment module, configured to adjust a parameter value of the target parameter according to the second touch operation.

According to a third aspect of the embodiments of the present disclosure, a parameter adjustment apparatus is provided, including:

a first screen displayed on a side surface of the terminal and a second screen displayed on a front surface and/or a back surface of the terminal;

a processor;

a memory configured to store instructions executable by the processor;

wherein the processor is configured to:

receive a first touch operation acting in a predetermined region of the first screen;

display an adjustment bar of a target parameter in the first screen according to the first touch operation, wherein the target parameter is related to an application displayed in the second screen;

receive a second touch operation acting on the adjustment bar;

adjust a parameter value of the target parameter according to the second touch operation.

According to a fourth aspect of the embodiments of the present disclosure, a computer readable storage medium is provided having stored therein at least one instruction, at least one program, a code set, or a set of instructions, wherein the at least one instruction, the at least one program, the code set, or the set of instructions is loaded and executed by the processor to implement a parameter adjustment method described in the first aspect.

It shall be understood that the above general description and the following detailed description are merely exemplary and explanatory and are not intended to be restrictive of the present disclosure.

BRIEF DESCRIPTION OF THE DRAWINGS

The accompanying drawings, which are incorporated in and constitute a part of this specification, illustrate embodiments consistent with the disclosure, and together with the description, serve to explain the principles of the disclosure.

DETAILED DESCRIPTION

Descriptions will now be made in detail to some embodiments, examples of which are illustrated in the accompanying drawings. When accompanying figures are mentioned in the following descriptions, the same numbers in different drawings represent the same or similar elements unless otherwise represented. The implementations set forth in the following description of some embodiments do not represent all implementations consistent with the present disclosure. Instead, they are merely examples of apparatuses and methods consistent with aspects related to the present disclosure as recited in the appended claims.

Some application scenarios involved in various embodiments of the present disclosure are described below.

For example, a parameter value of a target parameter is adjusted by using a terminal. In some embodiments, the terminal includes a first screen and a second screen. The first screen is displayed on a side surface of the terminal, and the second screen is displayed on a front surface of the terminal.

Alternatively, the second screen is displayed on a back surface of the terminal.

Alternatively, the second screen is displayed on the front surface and the back surface of the terminal. As the first screen and the second screen may be designed as two different regions in a same screen, or may be two screens independent from each other, terminals of these two structures are respectively described below.

1) The first screen and the second screen are designed as two different regions in the same screen.

Because areas of the front surface and the back surface of the terminal are both larger than an area of the side surface, a size of the second screen is larger than the size of the first screen. In an implementation, the second screen is designed as a full screen.

In some embodiments, the terminal may include only one first screen and one second screen. Alternatively, the terminal may further include another first screen which is being displayed on the side surface of another side of the terminal.

Figure 1:
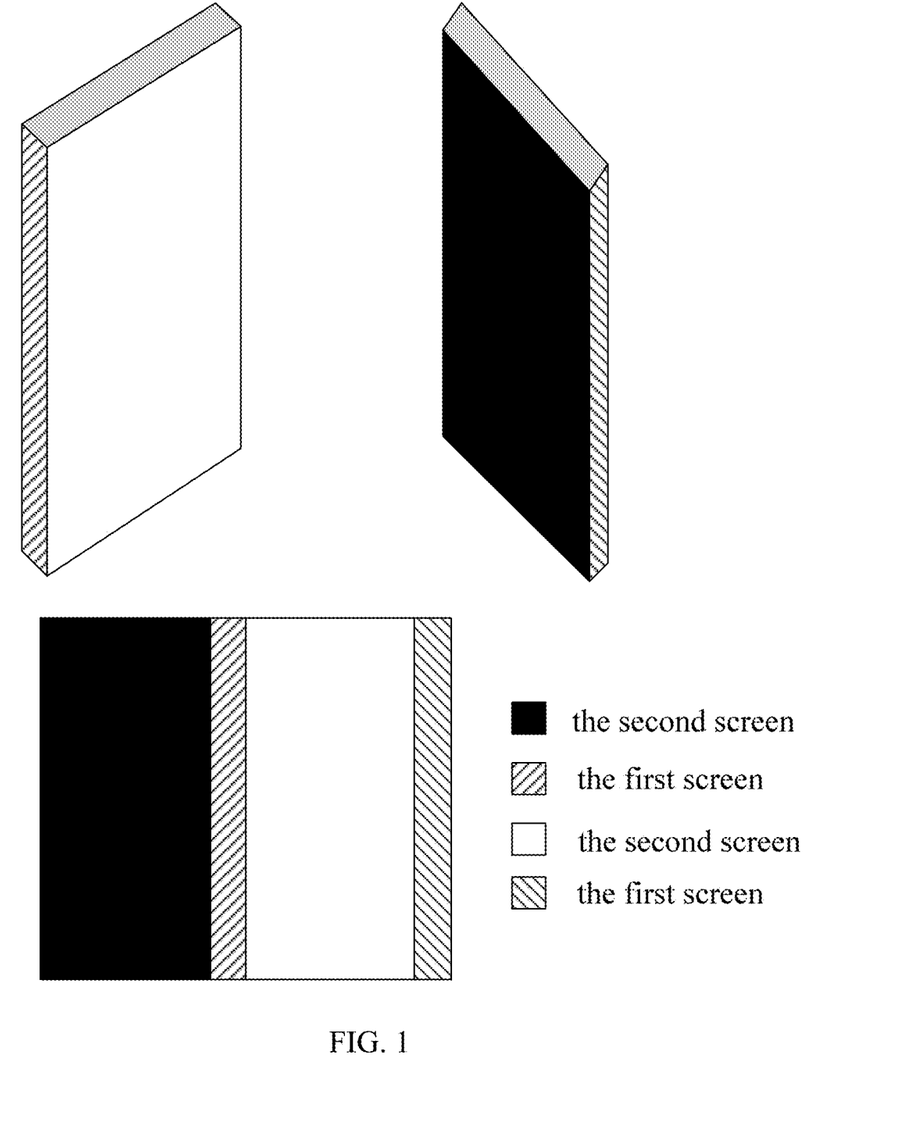
FIG. 1 is a schematic diagram of a terminal according to some embodiments.

FIG. 1 shows the terminal including two first screens and one second screen. The second screen is displayed on the front surface and the back surface of the terminal, and a screen with a left slash shadow is the first screen displayed on the left side surface of the terminal. A white screen is the second screen displayed on the front surface of the terminal, and a black screen is the second screen displayed on the back surface of the terminal. The screen with a right slash shadow is the first screen displayed on the right-side surface of the terminal. The gray scale part is an upper side surface of the terminal.

2) The first screen and the second screen may be two screens independent with each other.

In the embodiment, the size of the second screen is larger than the size of the first screen, as described in 1) above.

Figure 2:
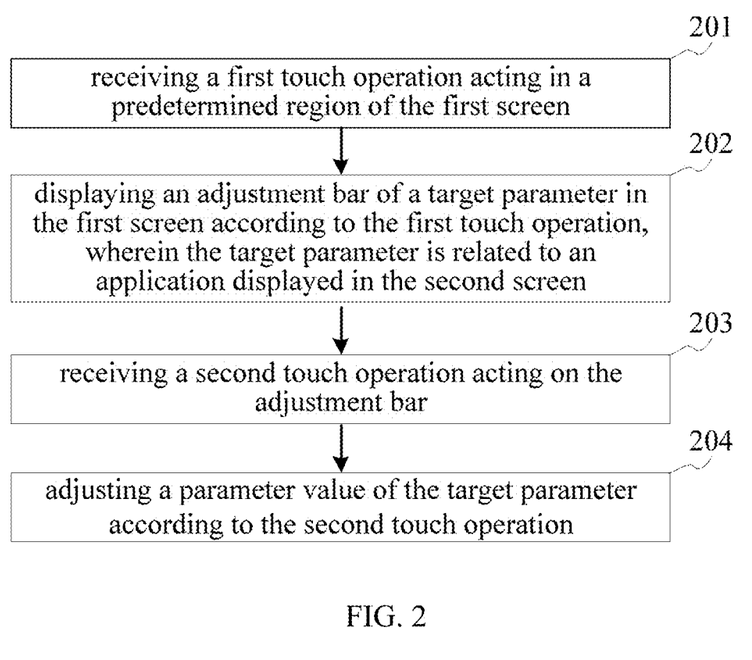
FIG. 2 is a flowchart diagram of a parameter adjustment method according to some embodiments.

FIG. 2 is a flowchart diagram of a parameter adjustment method according to some embodiments. The parameter adjustment method is applied to the terminal, which includes the first screen and the second screen. The first screen is displayed on the side surface of the terminal. The second screen is displayed on the front surface and/or the back surface of the terminal. As shown in FIG. 2, the parameter adjustment method includes the following steps.

In step 201, a first touch operation acting in a predetermined region of the first screen is received.

In step 202, an adjustment bar of the target parameter is displayed in the first screen according to the first touch operation, and the target parameter is related to the application displayed in the second screen.

In step 203, a second touch operation acting on the adjustment bar is received.

In step 204, the parameter value of the target parameter is adjusted according to the second touch operation.

Therefore, the parameter adjustment method provided by the present disclosure can display the adjustment bar of the target parameter related to an application in the first screen when the application is displayed in the second screen. In this way, the user can perform the second touch operation at the adjustment bar to adjust the parameter value of the target parameter, thereby avoiding problems that a physical button has a short service life when the parameter value of the target parameter is adjusted by the physical button, and achieving an effect of improving the service life of the terminal.

Figure 3:
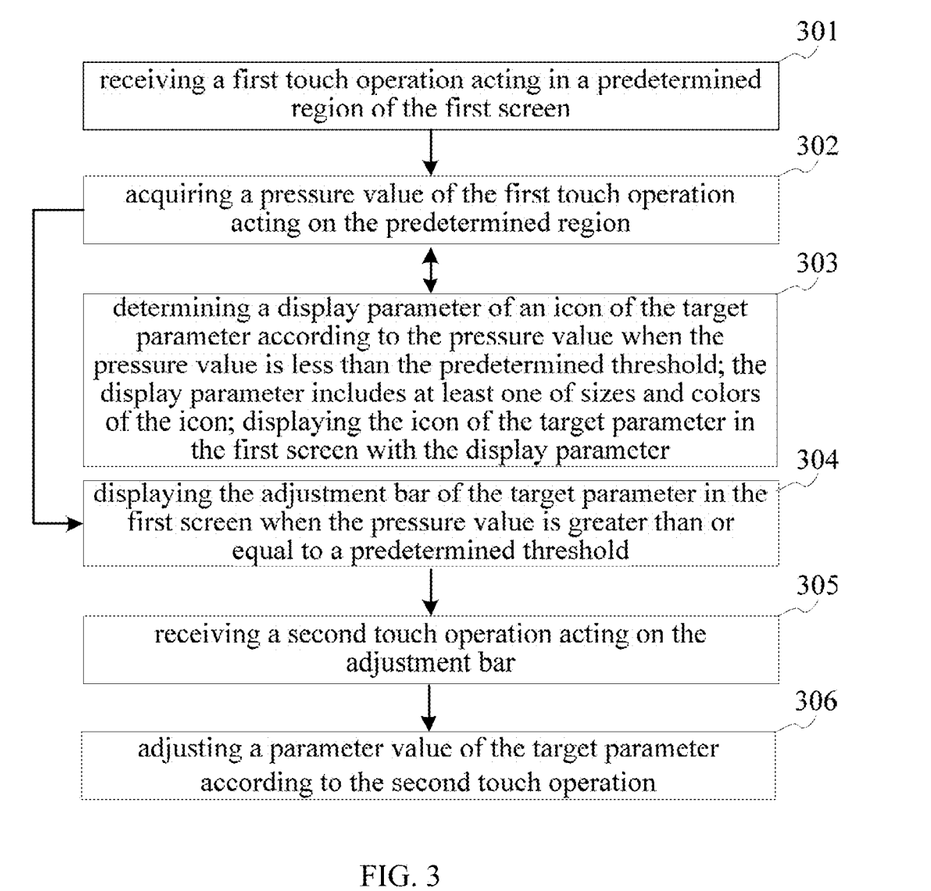
FIG. 3 is a flowchart diagram of a parameter adjustment method according to another exemplary embodiment.

FIG. 3 is a flowchart diagram of a parameter adjustment method according to another exemplary embodiment. The parameter adjustment method is applied to the terminal, the terminal includes the first screen and the second screen. The first screen is displayed on the side surface of the terminal. The second screen is displayed on the front surface and/or the back surface of the terminal. As shown in FIG. 3, the parameter adjustment method includes the following steps.

In step 301, the first touch operation acting in a predetermined region of the first screen is received.

In some embodiments, a region can be specified in the first screen as the predetermined region.

Alternatively, when a notification bar icon of time, weather, etc. is displayed in the first screen, a region may be specified in the region other than a display region in the first screen, and the region is configured as the predetermined region.

Alternatively, when an icon of the target parameter is not displayed in the first screen, any one of regions other than the display region may be configured as the predetermined region. When the icon of the target parameter is displayed in the first screen, a region including the icon of the target parameter may be specified as the predetermined region.

In the embodiments, the target parameter is a parameter that needs to adjust the parameter value, and the target parameter is related to the application displayed in the second screen. For example, when the application involving sound playback is displayed in the second screen, the target parameter may be set as a media volume and/or an audio progress.

When the application involving video playback is displayed in the second screen, the target parameter may be set as a media volume and/or a video progress. When the application involving reading is displayed in the second screen, the target parameter may be set as screen brightness and/or a reading progress (that is, a page turning progress).

When the application involving imaging is displayed in the second screen, the target parameter may be set as a flash color temperature and/or a focal length (that is, an image zoom factor).

When the application involving illumination is displayed in the second screen, the target parameter may be set as a flash brightness. When a desktop is displayed in the second screen, the target parameter may be set as a ringer volume. These embodiments are only described with respect the above-mentioned several target parameters as examples. Of course, other target parameters may be set according to the application displayed in the second screen, which is not limited in the present disclosure.

Alternatively, when the application displayed in the second screen is corresponding to the target parameter, a predetermined region may be set for the target parameter in the first screen. When the application displayed in the second screen is corresponding to at least two target parameters, a predetermined region may be set for each target parameter in the first screen.

Alternatively, when the terminal includes two first screens, the target parameter corresponding to each of the two first screens may be determined at first, and then the predetermined region is set for each target parameter in the first screen. For example, a text reading application is corresponding to the two target parameters including the screen brightness and the ringer volume, and the predetermined region corresponding to the screen brightness may be set in the first screen displayed on the left surface of the terminal. The predetermined region corresponding to the ringer volume is set in the first screen displayed on the right surface of the terminal.

In some embodiments, in the first screen, the icon of the target parameter may be displayed, or the icon of the target parameter may not be displayed, and the two cases are respectively described below.

In a first implementation, when the icon of the target parameter is displayed in the predetermined region of the first screen, the first touch operation acting on the icon is received.

When the first touch operation is acting on the icon of the target parameter, the terminal determines that the first touch operation is received. For example, the first touch operation is a click operation. When the user clicks on the icon of the target parameter, the terminal determines that the first touch operation is received.

Figure 4:
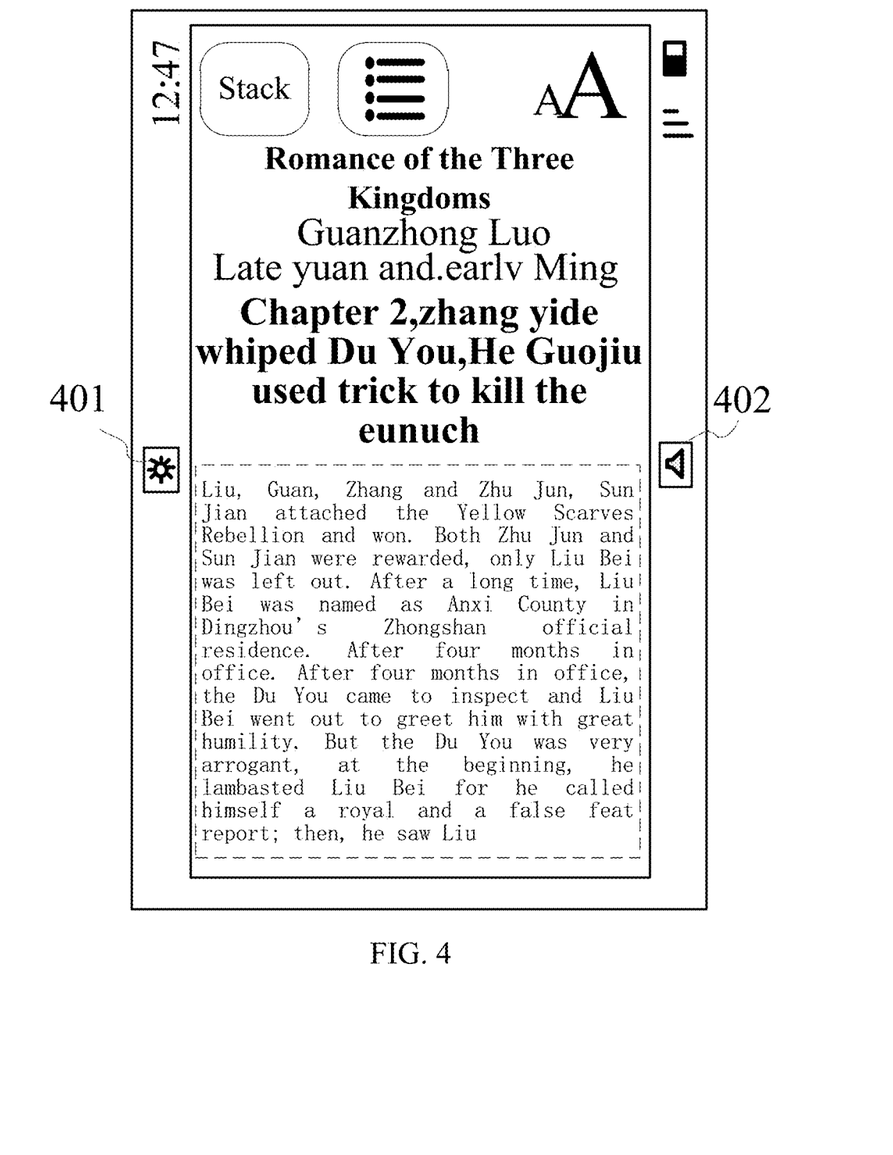
FIG. 4 is a display schematic diagram of an icon for adjusting parameters according to another exemplary embodiment.

Referring to FIG. 4, in some embodiments, an icon 401 of the screen brightness is displayed in the first screen on the left side surface, and an icon 402 of the ringer volume is displayed in the first screen on the right-side surface. When the user clicks the icon 401 of the screen brightness or the icon 402 of the ring volume, the terminal receives the first touch operation.

In a second implementation, when the icon of the target parameter is not displayed in the predetermined region of the first screen, the first touch operation acting on the predetermined region is received.

When the first touch operation acting on any position within the predetermined region, the terminal determines that the first touch operation is received. For example, the first touch operation is a click operation. When the user clicks on a center position or an edge position in the predetermined region, the terminal determines that the first touch operation is received.

In step 302, a pressure value of the first touch operation acting on the predetermined region is acquired. When the pressure value is less than a predetermined threshold, step 303 is performed. When the pressure value is greater than or equal to the predetermined threshold, step 304 is performed.

In some embodiments, a pressure sensor is provided in the predetermined region. Then, when the first touch operation is acting on the predetermined region, the pressure value of the first touch operation is acquired by the pressure sensor, and the pressure value is compared with the predetermined threshold.

According to operating habits of most users, a pressure applied by the user when performing the first touch operation is changed from a small value to a large value. The pressure value is initially less than the predetermined threshold. If the icon of the target parameter is not displayed in the first screen at this time, the icon may be displayed when the first touch operation is received. If the icon of the target parameter is displayed on the first screen at this time, the display parameter of the icon may be modified to reflect the change of the pressure, thereby improving experience of the user, that is, the step 303 is performed. Next, when the pressure value is greater than or equal to the predetermined threshold, the icon of the displayed target parameter may be switched to the adjustment bar of the target parameter, that is, the step 304 is performed. In the embodiment, a definition of the adjustment bar is described in detail in the step 304.

In the step 303, the display parameter of the icon of the target parameter is determined according to the pressure value, and the display parameter includes at least one of size and color of the icon. The icon of the target parameter is displayed in the first screen with the display parameter, and step 302 is continually performed.

When the display parameter includes the size, a magnitude of the pressure value is positively correlated with the magnitude of the size. That is, the larger the pressure, the larger the size. When the display parameter includes a color, the color can be switched when the first touch operation is received, for example, the color is switched from black to blue, and etc., which is not limited in the present disclosure.

Figure 5:
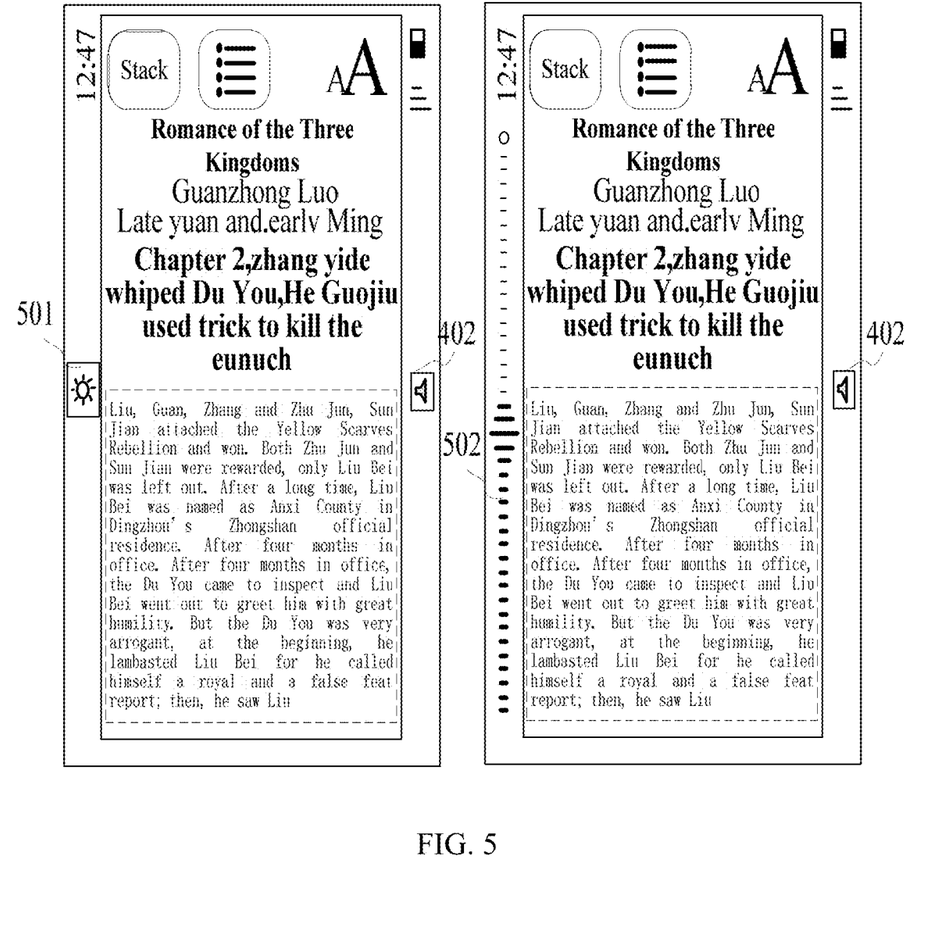
FIG. 5 is a display schematic diagram of an adjustment bar for adjusting parameters according to another exemplary embodiment.

Referring to FIG. 5, the display parameter including the size of the icon can be taken as an example. When the user clicks the icon 401 of the screen brightness in FIG. 4, the icon 401 of the screen brightness gradually becomes an icon 501 of the screen brightness in FIG. 5. The icon 402 of the ringer volume does not change.

Figure 6:
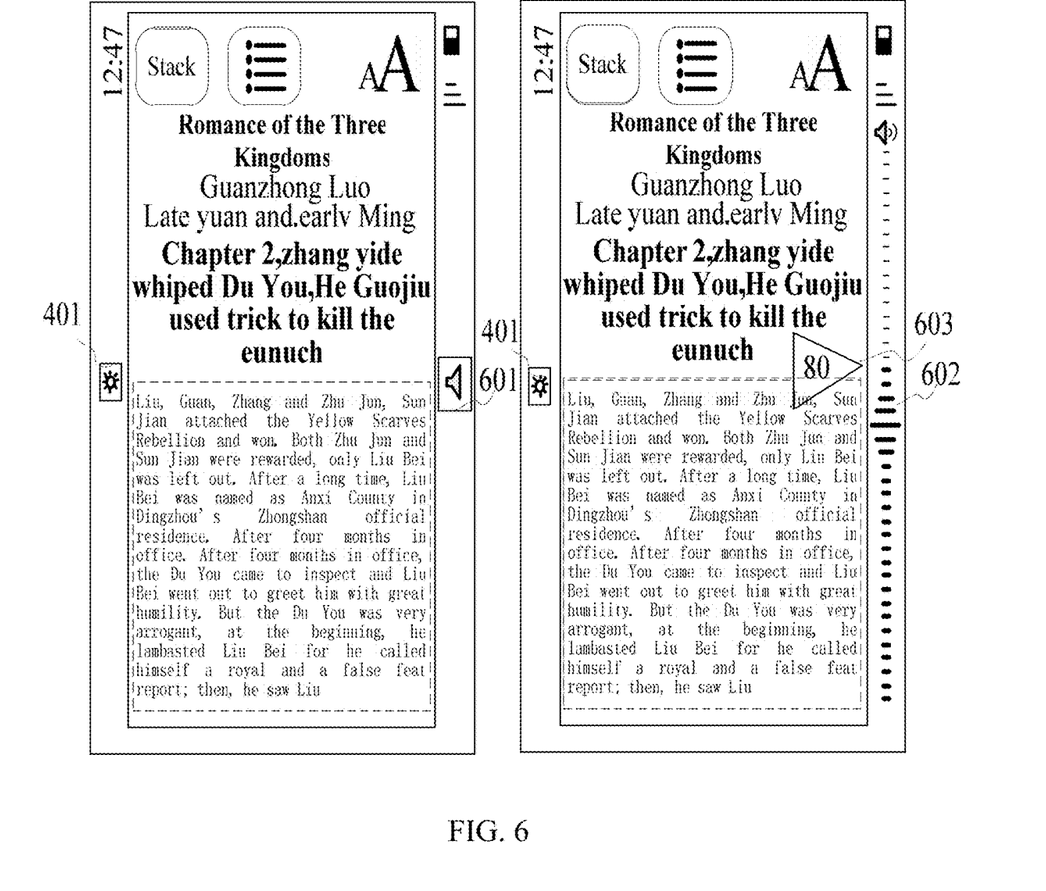
FIG. 6 is a display schematic diagram of an adjustment bar for adjusting parameters according to another exemplary embodiment.

Referring to FIG. 6, in some embodiments, the display parameter including the size of the icon is taken as an example. When the user clicks the icon 402 of the ringer volume in FIG. 4, the icon 402 of the ringer volume gradually becomes an icon 601 of the ringer volume in FIG. 6. The icon 401 of the screen brightness does not change.

Alternatively, when at least two target parameters related to the application exist, the target parameter corresponding to the predetermined region may be selected from the at least two target parameters according to the first touch operation, and different target parameters are corresponding to different predetermined regions, then the step 303 is performed.

Because performing the first touch operation by the user is a continuous process, the terminal can further acquire the pressure value, and then compare the pressure value with the predetermined threshold. That is, the step 302 is continually preformed, and the step 304 is performed until when the pressure value is greater than or equal to the predetermined threshold.

In step 304, the adjustment bar of the target parameter is displayed in the first screen.

The adjustment bar is set as a bar-shaped control for adjusting the target parameters. In an embodiment, the adjustment bar has a draggable button control. The user can set the parameter value of the target parameter by dragging a button control. In another implementation, the adjustment bar is consisted of grids sequentially arranged one by one. The user can select a grid to set the parameter values of the target parameters, referring to bar 502 of the brightness adjustment in FIG. 5 and bar 602 of the volume adjustment in FIG. 6.

Alternatively, when the at least two target parameters related to the application exist, the target parameter corresponding to the predetermined region may be selected from the at least two target parameters according to the first touch operation, and the different target parameters are corresponding to the different predetermined regions, then the step 304 is performed.

Alternatively, the terminal may further perform a vibration feedback when the pressure value is reached the predetermined threshold to prompt the user to switch the icon of the target parameter to the adjustment bar.

In step 305, the parameter value of the target parameter is adjusted according to the second touch operation.

The second touch operation may be a click operation, a sliding operation, or another touch operation, which is not limited in the present disclosure.

In step 306, the parameter value of the target parameter is adjusted according to the second touch operation.

In the first implementation, when the second touch operation is set as the click operation, an action position of the click operation in the adjustment bar is determined, and the value corresponding to the action position is used as the parameter value of the target parameter.

For example, the terminal can divide a maximum value of the target parameter by the length of the adjustment bar to obtain the value corresponding to each of action positions in the adjustment bar. When the terminal determines the action position of the click operation in the adjustment bar, the value corresponding to the action position is acquired, which is taken as the parameter value of the target parameter.

In the second implementation, when the second touch operation is set as the sliding operation, a sliding speed and a sliding distance of the sliding operation are determined, and the value determined based on the sliding speed and the sliding distance is taken as the parameter value of the target parameter.

In the embodiment, the magnitude of the sliding speed is positively correlated with the magnitude of a change of the parameter value, and the magnitude of sliding distance is positively correlated with the magnitude of the change of the parameter value. That is, the faster the sliding speed, the larger the parameter value changes, and the farther the sliding distance is, the larger the parameter value changes.

In some embodiments, a calculation formula between the sliding speed, the sliding distance, and the magnitude of the change of the parameter value can be set by the terminal. When the terminal determines the sliding speed and the sliding distance, a change value of the parameter value can be calculated according to the calculation formula, and a current parameter value and the change value are added or subtracted to obtain the parameter value of the target parameter.

Alternatively, the terminal can further display the parameter value of the target parameter at current time. Referring to FIG. 6, a volume value of the ringer volume indicated by an icon 603 in FIG. 6 is 80.

Alternatively, when the adjustment bar is not operated within a preset duration, the terminal can further hide the adjustment bar, so as to display other content in the first screen and to improve utilization of the first screen.

In an application scenario, the user performs the click operation within the predetermined region in the first screen. When the pressure value of the click operation is less than the predetermined threshold, the size of the icon of the target parameter in the predetermined region displayed by the terminal gradually becomes larger, and the color of the icon is switched from black to blue. When the pressure value of the click operation is equal to the predetermined threshold, the terminal performs the vibration feedback. The user continues to perform the sliding operation under a situation of not letting go. The terminal determines the parameter value of the target parameter according to the sliding speed and the sliding distance of the sliding operation. At this time, the adjustment of the target parameters can be achieved by one continuous operation, which can reduce complexity of the parameter adjustment and improve efficiency of the parameter adjustment.

In an application scenario, the user clicks on the icon of the target parameter displayed in the first screen. The terminal displays the adjustment bar in the first screen. The user clicks on the grid in the adjustment bar, and the parameter value of the target parameter is determined by the terminal according to the position of the grid in the adjustment bar.

Therefore, the parameter adjustment method provided by the present disclosure can display the adjustment bar of the target parameter related to the application in the first screen when the application is displayed in the second screen. In this way, the user can perform the second touch operation at the adjustment bar to adjust the parameter value of the target parameter, thereby avoiding the problems that the physical button has the short service life when the parameter value of the target parameter is adjusted by the physical button, and achieving the effect of improving the service life of the terminal.

Because the display parameter is determined according to the pressure value, the icon of the target parameter displayed in the first screen with the display parameter can reflect the change of the pressure to enhance the experience of the user.

When the adjustment bar is not operated within a preset duration, the terminal can further hide the adjustment bar, so as to display other content in the first screen and to improve utilization of the first screen.

Figure 7:
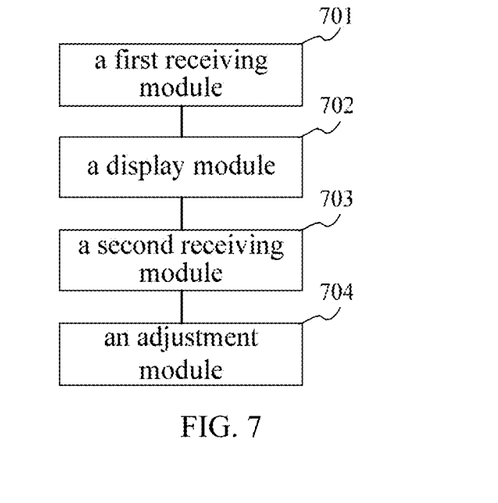
FIG. 7 is a block diagram of a parameter adjustment apparatus according to some embodiments.

FIG. 7 is a block diagram of a parameter adjustment apparatus according to some embodiments. The parameter adjustment apparatus is applied to the terminal, which includes the first screen and the second screen. The first screen is displayed on the side surface of the terminal. The second screen is displayed on the front surface and/or the back surface of the terminal. As shown in FIG. 7, the parameter adjustment apparatus includes a first receiving module 701, a display module 702, a second receiving module 703 and an adjustment module 704.

The first receiving module 701 is configured to receive the first touch operation acting in a predetermined region of the first screen.

The display module 702 is configured to display the adjustment bar of the target parameter in the first screen according to the first touch operation received by the first receiving module 701, and the target parameter is related to the application displayed in the second screen.

The second receiving module 703 is configured to receive the second touch operation acting on the adjustment bar displayed by the display module 702.

The adjustment module 704 is configured to adjust the parameter value of the target parameter according to the second touch operation received by the second receiving module 703.

Therefore, the parameter adjustment apparatus provided by the present disclosure can display the adjustment bar of the target parameter related to the application in the first screen when the application is displayed in the second screen. In this way, the user can perform the second touch operation at the adjustment bar to adjust the parameter value of the target parameter, thereby avoiding the problems that the physical button has the short service life when the parameter value of the target parameter is adjusted by the physical button, and achieving the effect of improving the service life of the terminal.

As shown in FIG. 7, in some embodiments, the display module 703 is further configured to perform the following steps.

The pressure value of the first touch operation acting on the predetermined region is acquired.

When the pressure value is greater than or equal to the predetermined threshold, the adjustment bar of the target parameter is displayed in the first screen.

In some implementations, the display module 703 is further configured to perform the following steps.

When the pressure value is less than a predetermined threshold, the display parameter of the icon of the target parameter is determined according to the pressure value, and the display parameter includes at least one of sizes and colors of the icon.

The icon of the target parameter is displayed in the first screen with the display parameter.

In an implementation, the display module 703 is further configured to perform the following steps.

The adjustment bar is hided when the adjustment bar is not operated within the preset duration.

In an implementation, the first receiving module 701 is further configured to perform the following steps.

When the icon of the target parameter is displayed in the predetermined region of the first screen, the first touch operation acting on the icon is received.

In an implementation, when the at least two target parameters related to the application exist, the display module 702 is further configured to perform the following steps.

The target parameter corresponding to the predetermined region is selected from the at least two target parameters according to the first touch operation, and the different target parameters are corresponding to the different predetermined regions.

The adjustment bar of the target parameter is displayed in the first screen.

In an implementation, the adjustment module 704 is further configured to perform the following steps.

When the second touch operation is set as the click operation, an action position of the click operation in the adjustment bar is determined, and the value corresponding to the action position is taken as the parameter value of the target parameter.

When the second touch operation is set as the sliding operation, a sliding speed and a sliding distance of the sliding operation are determined, and the value determined based on the sliding speed and the sliding distance is taken as the parameter value of the target parameter.

Therefore, the parameter adjustment apparatus provided by the present disclosure can display the adjustment bar of the target parameter related to the application in the first screen when the application is displayed in the second screen. In this way, the user can perform the second touch operation at the adjustment bar to adjust the parameter value of the target parameter, thereby avoiding the problems that the physical button has the short service life when the parameter value of the target parameter is adjusted by the physical button, and achieving the effect of improving the service life of the terminal.

Because the display parameter is determined according to the pressure value, the icon of the target parameter displayed in the first screen with the display parameter can reflect the change of the pressure to enhance the experience of the user.

When the adjustment bar is not operated within a preset duration, the terminal can further hide the adjustment bar, so as to display other content in the first screen and to improve utilization of the first screen.

With regard to the apparatus in the above embodiments, specific methods in which respective modules perform operations has been described in detail in the embodiments relating to the methods, and it will not be explained in detail herein.

Some embodiments of the present disclosure provide a parameter adjustment apparatus capable of implementing the parameter adjustment method provided by the present disclosure. The parameter adjustment apparatus includes the first screen and the second screen. The first screen is displayed on the side surface of the terminal. The second screen is displayed on the front surface and/or the back surface of the terminal. The parameter adjustment apparatus further includes a processor and a memory configured to store instructions executable by the processor.

In the embodiment, the processor is configured to perform the following steps.

A first touch operation acting in a predetermined region of the first screen is received.

An adjustment bar of the target parameter is displayed in the first screen according to the first touch operation, and the target parameter is related to the application displayed in the second screen.

A second touch operation acting on the adjustment bar is received.

The parameter value of the target parameter is adjusted according to the second touch operation.

Figure 8:
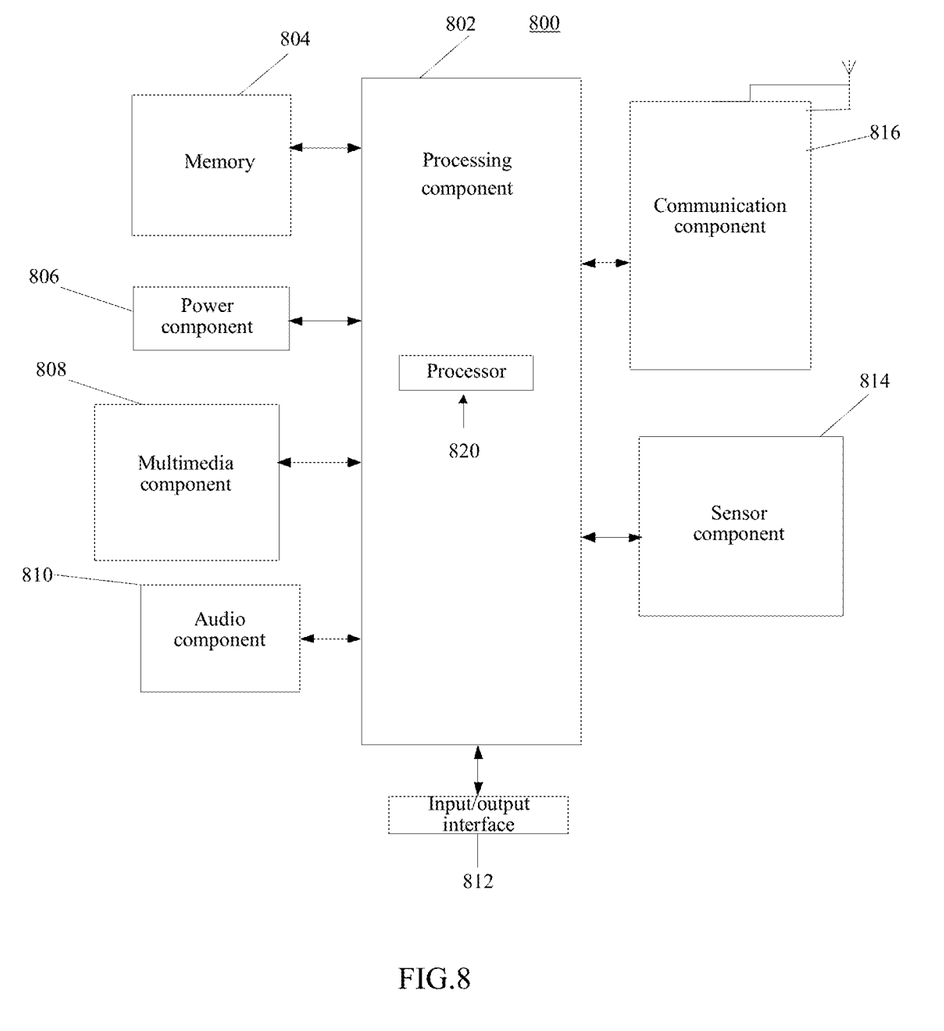
FIG. 8 is a block diagram of an apparatus for parameter adjustment according to some embodiments.

FIG. 8 is a block diagram of an apparatus 800 for parameter adjustment according to some embodiments. For example, the apparatus 800 can be a mobile phone, a computer, a digital broadcast terminal, a message transceiver apparatus, a game console, a tablet apparatus, a medical equipment, a fitness equipment, a personal digital assistant, etc.

Referring to FIG. 8, the apparatus 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 408 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 can be implemented using any type of volatile or non-volatile memory apparatus, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The power component 806 provides power to various components of the apparatus 800. The power component 806 can include a power management system, one or more power sources, and any other components associated with the generation, management, and distribution of power in the apparatus 800.

The multimedia component 808 includes a screen providing an output interface between the apparatus 400 and the user, and the screen includes the first screen and the second screen. In some embodiments, the screen can include a liquid crystal display (LCD) and a touch panel (TP).

In some embodiments, the screen can be a Light-Emitting Diode (LED) display, an Organic Light-Emitting Diode (OLED) display, etc. The LEDs can be a Micro LED, a Mini LED, etc.

If the screen includes the touch panel, the screen can be implemented as a touch screen to receive input signals from the user. The touch panel includes one or more touch sensors to sense touches, slips, and gestures on the touch panel. The touch sensors can not only sense a boundary of a touch or slip action, but also sense a period of time and a pressure associated with the touch or slip action. In some embodiments, the multimedia component 808 includes a front camera and/or a rear camera. The front camera and the rear camera can receive an external multimedia data while the apparatus 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode or a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules such as a keyboard, a click wheel, buttons, and the like. The buttons can include, but are not limited to, a home button, a volume button, a starting button or a locking button.

The sensor component 814 includes one or more sensors to provide status assessments of various aspects of the apparatus 800. For instance, the sensor component 814 can detect an open/closed status of the apparatus 800, relative positioning of components, e.g., can be the display and the keypad of the apparatus 800, can detect a change in position of the apparatus 800 or a component of the apparatus 800, a presence or absence of user contact with the apparatus 800, an orientation or an acceleration/deceleration of the apparatus 800 and a change in temperature of the apparatus 800. The sensor component 814 can include a proximity sensor configured to detect the presence of nearby objects without any physical contact. The sensor component 814 can include a light sensor, such as a CMOS or CCD image sensor, for use in imaging applications as well. In some embodiments, the sensor component 814 can include an accelerometer sensor, a gyroscope sensor, a magnetic sensor, a pressure sensor, or a temperature sensor as well.

The communication component 816 is configured to facilitate communication, wired or wirelessly, between the apparatus 800 and other apparatuses. The apparatus 800 can access a wireless network based on a communication standard, such as Wi-Fi, 2G, 3G, 4G, or 5G, or a combination thereof. In one exemplary embodiment, the communication component 416 receives a broadcast signal or broadcast-associated information from an external broadcast management system via a broadcast channel. In one exemplary embodiment, the communication component 816 further includes a near field communication (NFC) module to facilitate short-range communications. For example, the NFC module can be realized based on a radio frequency identification (RFID) technology, an infrared data association (IrDA) technology, an ultra-wideband (UWB) technology, a Bluetooth (BT) technology or other technologies.

In some embodiments, the apparatus 800 can be realized with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors or other electronic components, for performing the method described above.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

In some embodiments, there is further provided a non-transitory computer-readable storage medium including instructions, such as the memory 804 including the instructions executable by the processor 820 in the apparatus 800, for performing the above-described methods. For example, the non-transitory computer-readable storage medium can be a ROM, a RAM, a CD-ROM, a magnetic tape, a floppy disc, an optical data storage apparatus, etc.

A non-transitory computer readable storage medium, when instructions in the storage medium are executed by a processor of a mobile terminal, makes the mobile terminal be enabled to perform the parameter adjustment method described above.

Some embodiments of the present disclosure provide a computer readable storage medium having stored therein at least one instruction, at least one program, a code set, or a set of instructions. The at least one instruction, the at least one program, the code set, or the set of instructions is loaded and executed by the processor to implement the parameter adjustment method as described above.

After considering this description and carrying out the embodiments disclosed herein, those skilled in the art can easily think of other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

In the present disclosure, it is to be understood that the terms "upper," "center," "length," "front," "back," "left," "right," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," second element may indicate direct contact between the first and second elements, without contact, or indirect through an intermediate medium, unless otherwise explicitly stated and defined.

In the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or applications (apps) can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

In the description of the present disclosure, the terms "one embodiment," "some embodiments," "example," "specific implementation," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A parameter adjustment method, wherein the method is applied to a terminal comprising a first screen and a second screen, and wherein the first screen is at a side surface of the terminal and the second screen is at one of a front surface or a back surface, or both the front surface and the back surface, of the terminal, and configured to adjust at least one of a media volume, an audio progress, video progress, reading progress, a flash color temperature, a flash brightness and a ringer volume of the terminal, the method comprising:
   receiving a first touch operation at a predetermined region of the first screen;
   displaying an adjustment bar of a target parameter at the first screen according to the first touch operation in a continuous process, by:
      acquiring a pressure value of the first touch operation acting on the predetermined region;
      determining a display parameter of an icon of the target parameter according to the pressure value when the pressure value is less than the predetermined threshold; the display parameter comprising at least one of sizes and colors of the icon, when the display parameter is configured to comprise a size, a magnitude of the pressure value is positively correlated with the magnitude of the size, when the display parameter is configured to comprise a color, the color can be switched when the first touch operation is received;
      displaying the icon of the target parameter in the first screen with the display parameter; and
      performing a vibration feedback and displaying the adjustment bar of the target parameter in the first screen when the pressure value is equal to the predetermined threshold;
   displaying the adjustment bar of the target parameter in the first screen when the pressure value is greater than the predetermined threshold;
   wherein the target parameter is associated with an application displayed at the second screen;
   receiving a second touch operation at the adjustment bar;
   adjusting a parameter value of the target parameter according to the second touch operation.

2. The method according to claim 1, further comprising:
   hiding the adjustment bar when the adjustment bar is not operated within a preset duration.

3. The method according to claim 1, wherein the receiving a first touch operation acting in a predetermined region of the first screen comprises:

receiving the first touch operation acting on the icon when the icon of the target parameter is displayed in the predetermined region of the first screen.

4. The method according to claim 1, wherein when at least two target parameters related to the application exist, the displaying of an adjustment bar of a target parameter in the first screen according to the first touch operation comprises:
selecting the target parameter corresponding to the predetermined region from the at least two target parameters according to the first touch operation; wherein different target parameters correspond to different predetermined regions; and
displaying the adjustment bar of the target parameter in the first screen.

5. The method according to claim 1, wherein the adjusting of a parameter value of the target parameter according to the second touch operation comprises:
determining an action position of a click operation in the adjustment bar when the second touch operation is set as the click operation; a value corresponding to the action position is taken as the parameter value of the target parameter; and
determining a sliding speed and a sliding distance of a sliding operation when the second touch operation is set as the sliding operation;
wherein the value determined based on the sliding speed and the sliding distance is taken as the parameter value of the target parameter.

6. A parameter adjustment apparatus, comprising:
a first screen displayed at a side surface of a terminal;
a second screen at a front surface or a back surface, or both the front surface and the back surface, of a terminal;
a processor;
memory configured to store instructions executable by the processor;
wherein the processor is used to adjust at least one of a media volume, an audio progress, video progress, reading progress, a flash color temperature, a flash brightness and a ringer volume of the terminal and configured to:
receive a first touch operation at a predetermined region of the first screen;
display an adjustment bar of a target parameter at the first screen according to the first touch operation in a continuous process, by:
acquiring a pressure value of the first touch operation acting on the predetermined region;
determining a display parameter of an icon of the target parameter according to the pressure value when the pressure value is less than the predetermined threshold; the display parameter comprising at least one of sizes and colors of the icon, when the display parameter is configured to comprise a size, a magnitude of the pressure value is positively correlated with the magnitude of the size, when the display parameter is configured to comprise a color, the color can be switched when the first touch operation is received;
displaying the icon of the target parameter in the first screen with the display parameter; and
performing a vibration feedback and displaying the adjustment bar of the target parameter in the first screen when the pressure value is equal to the predetermined threshold;
display the adjustment bar of the target parameter in the first screen when the pressure value is greater than the predetermined threshold;
wherein the target parameter is associated with an application displayed in the second screen;
receive a second touch operation at the adjustment bar; and
adjust a parameter value of the target parameter according to the second touch operation.

7. The apparatus according to claim 6, wherein the processor is further configured to:
hide the adjustment bar when the adjustment bar is not operated within a preset duration.

8. The apparatus according to claim 6, wherein the processor is further configured to:
receive the first touch operation acting on the icon when the icon of the target parameter is displayed in the predetermined region of the first screen.

9. The apparatus according to claim 6, wherein the processor is further configured to:
select the target parameter corresponding to the predetermined region from the at least two target parameters according to the first touch operation; wherein different target parameters correspond to different predetermined regions; and
display the adjustment bar of the target parameter in the first screen.

10. The apparatus according to claim 6, wherein the processor is further configured to:
determine an action position of a click operation in the adjustment bar when the second touch operation is set as the click operation; a value corresponding to the action position is taken as the parameter value of the target parameter; and
determine a sliding speed and a sliding distance of a sliding operation when the second touch operation is set as the sliding operation; the value determined based on the sliding speed and the sliding distance is taken as the parameter value of the target parameter.

11. A non-transitory computer-readable storage medium having stored therein at least one instruction, at least one program, a code set, or a set of instructions, wherein the at least one instruction, the at least one program, the code set, or the set of instructions is loaded and executed by a processor to implement a parameter adjustment method to adjust at least one of a media volume, an audio progress, video progress, reading progress, a flash color temperature, a flash brightness and a ringer volume of the terminal, the method including:
receiving a first touch operation at a predetermined region of a first screen;
displaying an adjustment bar of a target parameter at the first screen according to the first touch operation in a continuous process, by:
acquiring a pressure value of the first touch operation acting on the predetermined region;
determining a display parameter of an icon of the target parameter according to the pressure value when the pressure value is less than the predetermined threshold; the display parameter comprising at least one of sizes and colors of the icon, when the display parameter is configured to comprise a size, a magnitude of the pressure value is positively correlated with the magnitude of the size, when the display parameter is configured to comprise a color, the color can be switched when the first touch operation is received;
displaying the icon of the target parameter in the first screen with the display parameter; and performing a vibration feedback and displaying the adjustment bar of the target parameter in the first screen when the pressure value is equal to the predetermined threshold;

displaying the adjustment bar of the target parameter in the first screen when the pressure value is greater than the predetermined threshold;

wherein the target parameter is associated with an application displayed at a second screen;

receiving a second touch operation acting on the adjustment bar; and adjusting a parameter value of the target parameter according to the second touch operation.

12. The non-transitory computer-readable storage medium according to claim 11, wherein the method further comprises:

hiding the adjustment bar when the adjustment bar is not operated within a preset duration.

13. The non-transitory computer-readable storage medium according to claim 11, wherein the receiving a first touch operation acting in a predetermined region of the first screen comprises:

receiving the first touch operation acting on the icon when the icon of the target parameter is displayed in the predetermined region of the first screen.

14. The non-transitory computer-readable storage medium according to claim 11, wherein when at least two target parameters related to the application exist, the displaying of an adjustment bar of a target parameter in the first screen according to the first touch operation comprises:

selecting the target parameter corresponding to the predetermined region from the at least two target parameters according to the first touch operation; wherein different target parameters correspond to different predetermined regions; and displaying the adjustment bar of the target parameter in the first screen.

* * * * *